United States Patent [19]

Bartel

[11] Patent Number: 5,672,042
[45] Date of Patent: Sep. 30, 1997

[54] UNDERLIFT ASSEMBLY TOW TRUCKS

[75] Inventor: James J. Bartel, Southfield, Mich.

[73] Assignee: Jerr-Dan Corporation, Greencastle, Pa.

[21] Appl. No.: 550,772

[22] Filed: Oct. 31, 1995

[51] Int. Cl.[6] ...................................................... B60P 3/12
[52] U.S. Cl. ................................................ 414/563; 280/402
[58] Field of Search .................................. 414/563, 546, 414/547, 549, 553, 555, 738, 739, 740; 280/402; 254/3 R, 3 B, 3 C

[56] References Cited

U.S. PATENT DOCUMENTS

| | | | |
|---|---|---|---|
| 2,183,478 | 12/1939 | Holmes et al. | 212/141 |
| 2,436,000 | 2/1948 | Fleming . | |
| 2,449,146 | 9/1948 | Ryan . | |
| 2,495,493 | 1/1950 | Wright | 280/32.44 |
| 2,625,278 | 1/1953 | Sensenbaugh . | |
| 2,793,770 | 5/1957 | St. Denis . | |
| 3,434,607 | 3/1969 | Nelson . | |
| 3,667,630 | 6/1972 | Scott . | |
| 3,667,631 | 6/1972 | Bishop . | |
| 3,951,280 | 4/1976 | Peck . | |

(List continued on next page.)

FOREIGN PATENT DOCUMENTS

| | | | |
|---|---|---|---|
| 2690883 | 11/1993 | France | 414/563 |
| 251253 | 11/1987 | Japan | 414/563 |
| 2239232 | 6/1991 | United Kingdom | 280/402 |
| 2238290 | 5/1995 | United Kingdom . | |

OTHER PUBLICATIONS

Abstract of Canadian Patent No. 2069809–A, Issued May 28, 1992, "Wheel Engaging System for Towing Vehicle Wheel Lifts", Derwent Publications Ltd. London, England 1993.

*Primary Examiner*—Frank E. Werner
*Attorney, Agent, or Firm*—McDermott, Will & Emery

[57] ABSTRACT

An improved underlift assembly is provided for attachment to a vehicle. The improved underlift assembly comprises a support arm coupled to the vehicle. A base is coupled to an end of the support arm, a boom base is pivotally attached to the base at a first pivot point and a boom is pivotally attached to the boom base at a second pivot point. A first actuator is coupled to the support arm and the boom base. The operation of the first actuator pivots the boom base with respect to the support arm. A second actuator is coupled to the boom base and the boom. The operation of the second actuator pivots the boom with respect to the boom base. The first actuator is used to position the boom during lifting operation, and the second actuator is used to position the boom into a folded rest position.

19 Claims, 6 Drawing Sheets

United States Patent [19]

Bartel

[11] Patent Number: 5,672,042
[45] Date of Patent: Sep. 30, 1997

[54] UNDERLIFT ASSEMBLY TOW TRUCKS

[75] Inventor: James J. Bartel, Southfield, Mich.

[73] Assignee: Jerr-Dan Corporation, Greencastle, Pa.

[21] Appl. No.: 550,772

[22] Filed: Oct. 31, 1995

[51] Int. Cl.[6] ........................................ B60P 3/12
[52] U.S. Cl. ........................................ 414/563; 280/402
[58] Field of Search ........................ 414/563, 546, 414/547, 549, 553, 555, 738, 739, 740; 280/402; 254/3 R, 3 B, 3 C

[56] References Cited

U.S. PATENT DOCUMENTS

| | | |
|---|---|---|
| 2,183,478 | 12/1939 | Holmes et al. ............ 212/141 |
| 2,436,000 | 2/1948 | Fleming . |
| 2,449,146 | 9/1948 | Ryan . |
| 2,495,493 | 1/1950 | Wright ............ 280/32.44 |
| 2,625,278 | 1/1953 | Sensenbaugh . |
| 2,793,770 | 5/1957 | St. Denis . |
| 3,434,607 | 3/1969 | Nelson . |
| 3,667,630 | 6/1972 | Scott . |
| 3,667,631 | 6/1972 | Bishop . |
| 3,951,280 | 4/1976 | Peck . |

(List continued on next page.)

FOREIGN PATENT DOCUMENTS

| | | | |
|---|---|---|---|
| 2690883 | 11/1993 | France ........ | 414/563 |
| 251253 | 11/1987 | Japan ........ | 414/563 |
| 2239232 | 6/1991 | United Kingdom ........ | 280/402 |
| 2238290 | 5/1995 | United Kingdom . | |

OTHER PUBLICATIONS

Abstract of Canadian Patent No. 2069809–A, Issued May 28, 1992, "Wheel Engaging System for Towing Vehicle Wheel Lifts", Derwent Publications Ltd. London, England 1993.

*Primary Examiner*—Frank E. Werner
*Attorney, Agent, or Firm*—McDermott, Will & Emery

[57] ABSTRACT

An improved underlift assembly is provided for attachment to a vehicle. The improved underlift assembly comprises a support arm coupled to the vehicle. A base is coupled to an end of the support arm, a boom base is pivotally attached to the base at a first pivot point and a boom is pivotally attached to the boom base at a second pivot point. A first actuator is coupled to the support arm and the boom base. The operation of the first actuator pivots the boom base with respect to the support arm. A second actuator is coupled to the boom base and the boom. The operation of the second actuator pivots the boom with respect to the boom base. The first actuator is used to position the boom during lifting operation, and the second actuator is used to position the boom into a folded rest position.

19 Claims, 6 Drawing Sheets

UNDERLIFT ASSEMBLY TOW TRUCKS

BACKGROUND OF THE INVENTION

The present invention relates to tow trucks, for towing a disabled vehicle, and more particularly to an underlift assembly for tow trucks which engages and lifts the frame or wheels of a vehicle.

Tow trucks, for towing disabled vehicles by lifting either the front or rear wheels off the ground, and towing the partially-lifted automobile on its remaining two wheels, have long been used. The more modern and readily used types of tow trucks are known as "wheel-lift" tow trucks. A wheel lift tow truck engages and lifts the vehicle to be towed at either its front or rear wheels (tires).

Wheel-lift tow trucks generally employ a telescoping or folding main boom element attached to the rear of the truck and extending rearwardly from or out beyond the truck's rear deck (the space between the rear of the cab and the rear bumper). The boom or crane element represents the main lifting or leverage component for lifting one end of the vehicle to be towed. Such tow trucks also utilize a wheel engaging apparatus, hereinafter referred to as the wheel grid, for engaging and holding the front or rear wheels of a vehicle. When positioning the system for towing, the boom is maneuvered into a position against the tread of the tires and the wheel grid is locked into a position securing the tires in place against the boom. Examples of such a wheel-lift tow truck include: Youngblood, U.S. Pat. Nos. 4,186,938 and 4,194,755; LoCodo, U.S. Pat. No. 4,264,262; Lind, U.S. Pat. No. 4,473,237; Brown, U.S. Pat. No. 4,473,334; Russ, U.S. Pat. No. 4,564,207; Capers et al., U.S. Pat. No. 4,678,392; Muller, U.S. Pat. No. 4,701,099; Carey, U.S. Pat. No. 4,741,661; Brown, U.S. Pat. No. 4,761,111; Shoup et al., U.S. Pat. No. 4,797,057; Nespor, U.S. Pat. No. 4,927,315; Schardt, U.S. Pat. No. 5,013,205; DeMichele et al., U.S. Pat. No. 5,013,209; Franken et al., U.S. Pat. No. 5,259,572; Elfstrom, U.S. Pat. No. 5,302,074; Russ, U.S. Pat. No. 5,326,216; Curten, U.S. Pat. No. 5,336,037; Weller, U.S. Pat. No. 5,350,271; Wern, Canadian Patent No. CA 2069809-A; and Jones, UK Pat. App. GB 2 238 290 A.

Typically in the prior art, the boom is stored in an upright folded position. As exemplified by Cullum et al., U.S. Pat. No. 5,284,415, the lifting operation and the folding of the boom is performed with a single hydraulic actuator. The use of a single hydraulic actuator for both functions results in reduced ground clearance when in use and in storage and a lack of power in the lifting operation. The hydraulic cylinder extends down towards the ground as it lifts the boom and therefore ground clearance is reduced by a hydraulic actuator that requires a long extension to perform both the lifting operation and folding function.

None of the patents described above provides the important advantages of, providing an underlift assembly for tow trucks having increased ground clearance and increased lifting ability.

SUMMARY OF THE INVENTION

According to the invention, an improved underlift assembly having improved ground clearance and improved lifting ability is provided for attachment to a tow truck. The improved underlift assembly comprises a support arm coupled to the tow truck having a truck chassis with a bed frame made up of spaced frame members, and a deck assembly situated upon the bed frame. A base is coupled by a first end to an end of the support arm. A boom base is pivotally attached to the base at a first pivot point and a boom is pivotally attached to the boom base at a second pivot point. A first actuator is coupled to the support arm and the boom base. The operation of the first actuator pivots the boom base with respect to the support arm. A second actuator is coupled to the boom base and the boom. The operation of the second actuator pivots the boom with respect to the boom base.

In a preferred embodiment the first pivot point is located adjacent to a second end of the base that is opposite to the first end of base, and adjacent to a first end of the boom base. The boom base has a second end that is located nearer to the first end of the base than is the first end of the boom base. The second pivot point is located further from the first end of the boom base than the first pivot point.

The present invention preserves the advantages of known tow truck equipment. In addition, it provides new advantages not found in currently available equipment and overcomes many of the disadvantages associated with the known equipment.

As pointed out in greater detail below, the present invention provides an underlift assembly that uses a first actuator to perform the lifting operation with a minimum extension required by the first actuator. The first actuator provides maximum ground clearance and power due to its reduced extension. A second actuator is used to perform the folding function.

The improved underlift assembly has increased ground clearance because the first actuator which is directed towards the ground has a shorter range of extension than the main actuators of the prior art. The second actuator which is not directed towards the ground provides the additional extension needed to perform the folding function. The present invention may be adapted for use with underlift towing equipment of various types and sizes, including light and heavy duty equipment and both wheel and frame-lift systems.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
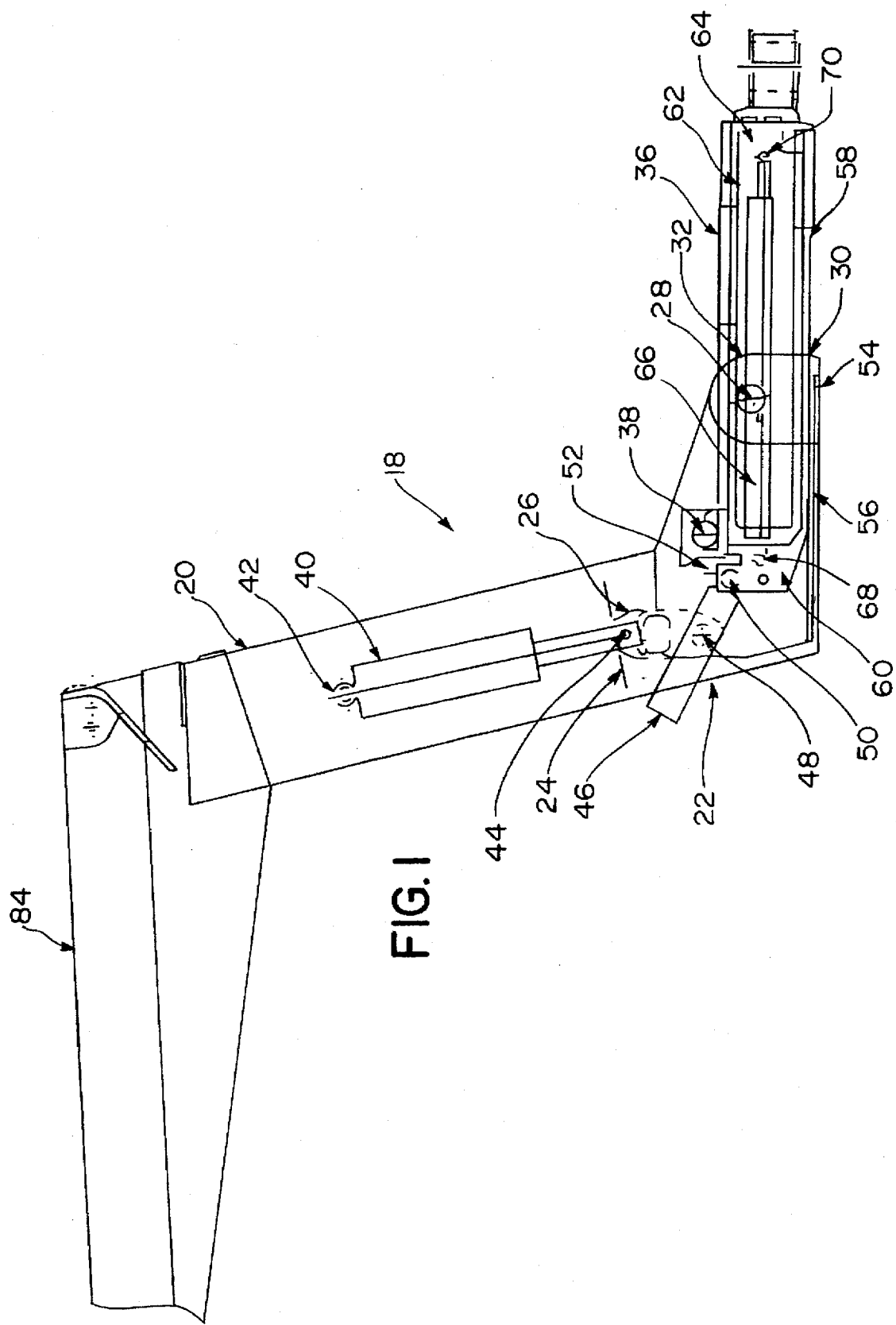
FIG. 1 is a side view of the present invention, shown in the normal operating position.

Turning now to the drawings, FIGS. 1-6 show an underlift assembly 18 for attachment to a tow truck. As shown in FIGS. 1-4 the underlift assembly 18 has a support arm 20 that is coupled to the towing vehicle. A base 22 is coupled at a first end 24 to the support arm 20. A boom base 26 is pivotally attached to the base 22 at a first pivot point 28. The first pivot point 28 is preferably located adjacent to a second end 30 of the base 22 that is opposite to the first end of the base 24, and adjacent to a first end 32 of the boom base 26. The boom base 26 has a first end 32 and a second end 34. The second end 34 is located nearer to the first end of the base 24 than is the first end of the boom base 32. A boom 36 is pivotally attached to the boom base 26 at a second pivot point 38 that is preferably located further from the first end of the boom base 32 than the first pivot point 28. A first actuator 40 is coupled to the support arm 20 by a pivot pin 42 and the boom base 26 by a pivot pin 44. The first actuator 40 pivots the boom base 26 with respect to the support arm 20. A second actuator 46 is coupled to the boom base 26 by pivot pin 48 and the boom 36 by pivot pin 50. The second actuator 46 pivots the boom 36 with respect to the boom base 26. Vehicle engaging attachments are connected to a distal end of the boom which may engage the vehicle's frame or wheels. A suitable wheel engaging attachment is illustrated in U.S. Pat. Nos. 4,741,661, and 4,797,057, which are incorporated herein by reference.

In the preferred embodiment a first stop 52 is attached to the boom base 26. The first stop 52 is preferably located between the second pivot point 38 and the second end of the boom base 34. A second stop 54 is attached to the boom base 26. The second stop 54 is preferably located below the first pivot point 28. The first and second stops 52, 54 restrict the pivot range of the boom 36 with respect to the boom base 26. The first stop 52 and the second stop 54 restrict the boom 36 from pivoting below a line formed by a lower edge of the boom base 56.

Figure 2:
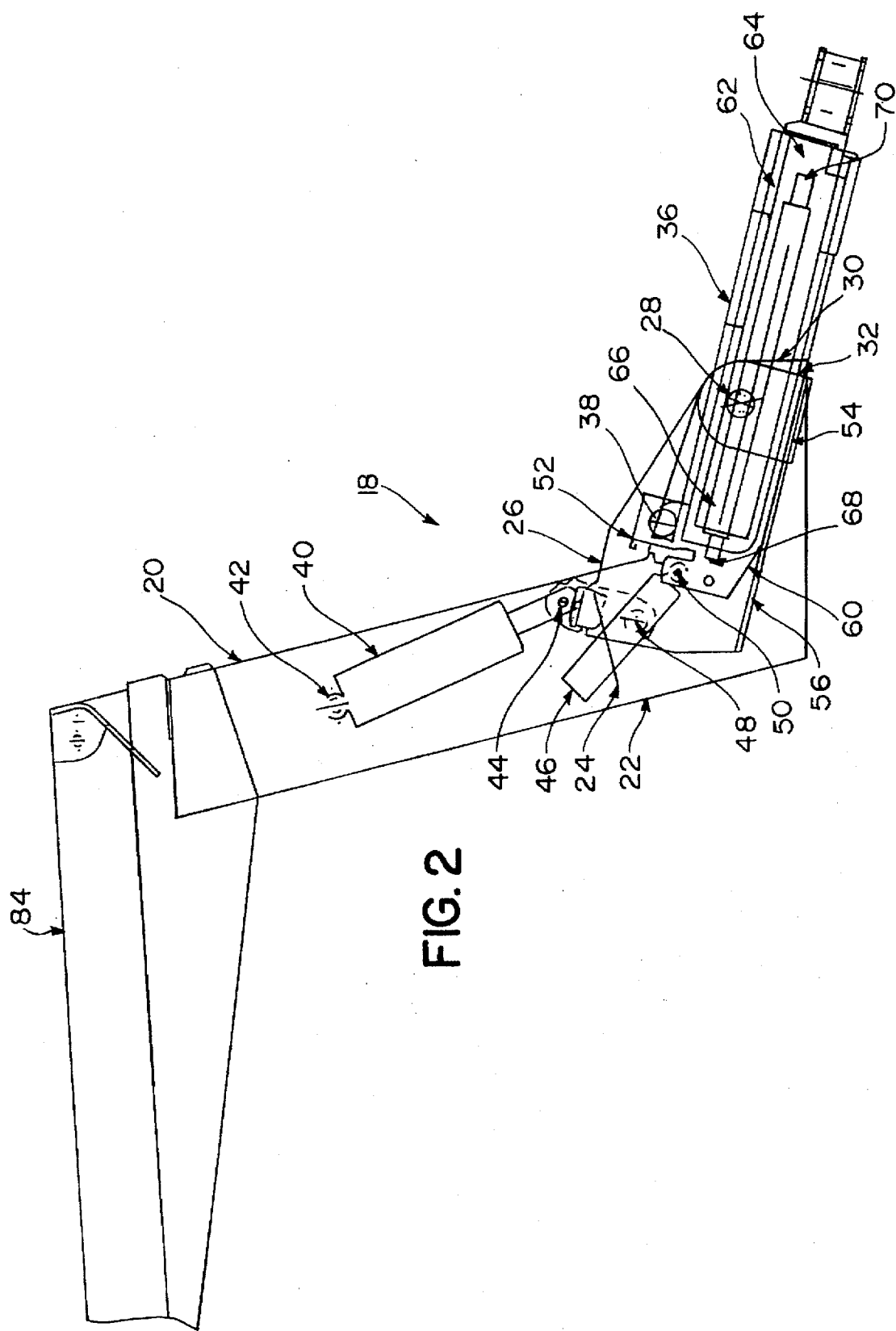
FIG. 2 is a side view of the present invention, shown with the boom base pivoted at about a 15 degree decline.
Figure 3:
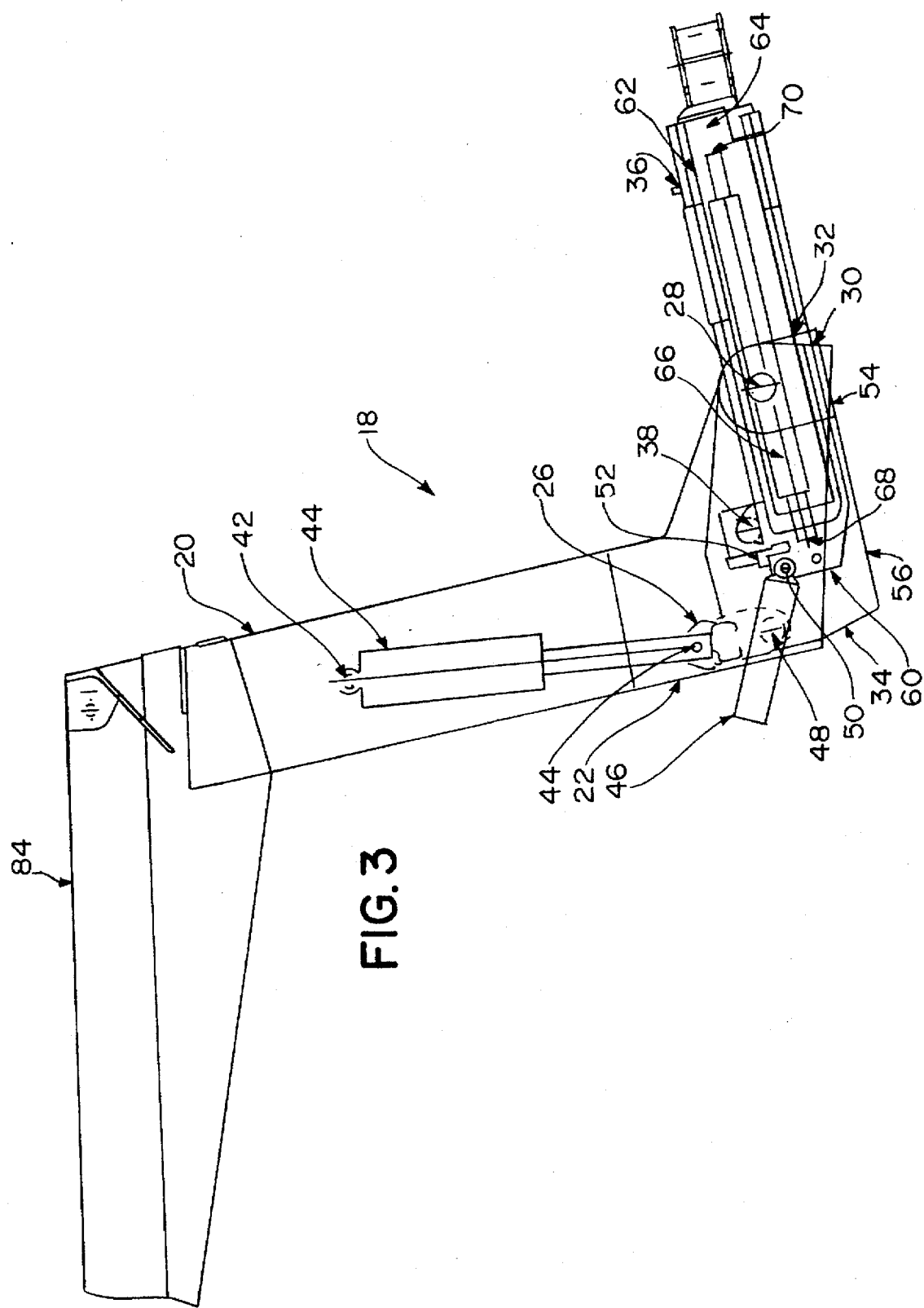
FIG. 3 is a side view of the present invention, shown with the boom pivoted at about a 15 degree incline.
Figure 4:
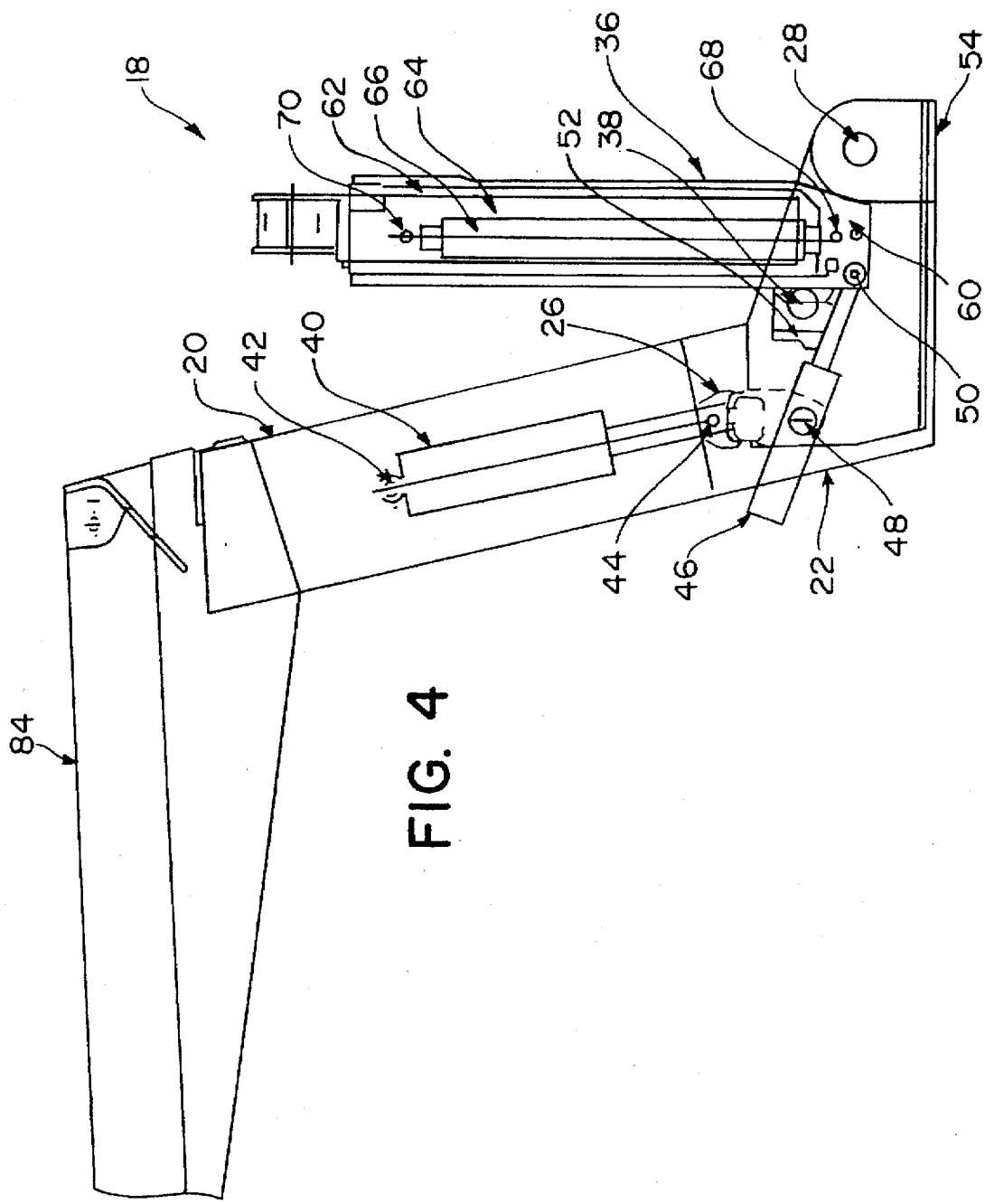
FIG. 4 is a side view of the present invention, shown with the boom pivoted into a folded position.

As shown in FIGS. 2 and 3, the first actuator 40 is used to position the boom 36 during lifting operation. In order to lift the vehicle to be lifted the first actuator 40 is extended to pivot the boom base 26 downward around the first pivot point 28. The first and second stops 52, 54 restrain the boom 36 from pivoting downward, forcing the boom 36 to be pivoted upward. The boom base 26 pivots, with respect to the base 22, with a range of motion of approximately about plus or minus 15 degrees from horizontal. As shown in FIG. 4 the second actuator 46 is used to position the boom 36 into a folded rest position. In order to fold the boom 36 into a rest position the second actuator 46 is extended which pivots the boom 36 around the second pivot point 38. The boom 36 pivots, with respect to the boom base 26, from a position where a lower edge of the boom 58 is substantially level with the lower edge of the boom base 56 upward to a position where the boom 36 is substantially parallel to the support arm 20.

In the preferred embodiment, the boom 36 comprises a first boom stage 60, a second boom stage 62, and a third boom stage 64. The three boom stages are telescopically related. The first boom stage 60 is pivotally attached to the boom base 26 at the second pivot point 38. The second actuator 46 is coupled to the first boom stage 60. A third actuator 66 is coupled to the first boom stage 60 by a first pivot pin 68, and the third boom stage 64 by a second pivot pin 70. The operation of the third actuator 66 telescopes the three boom stages. The first, second, and third actuators 40, 46, 66 are preferably hydraulic actuators.

Figure 5:
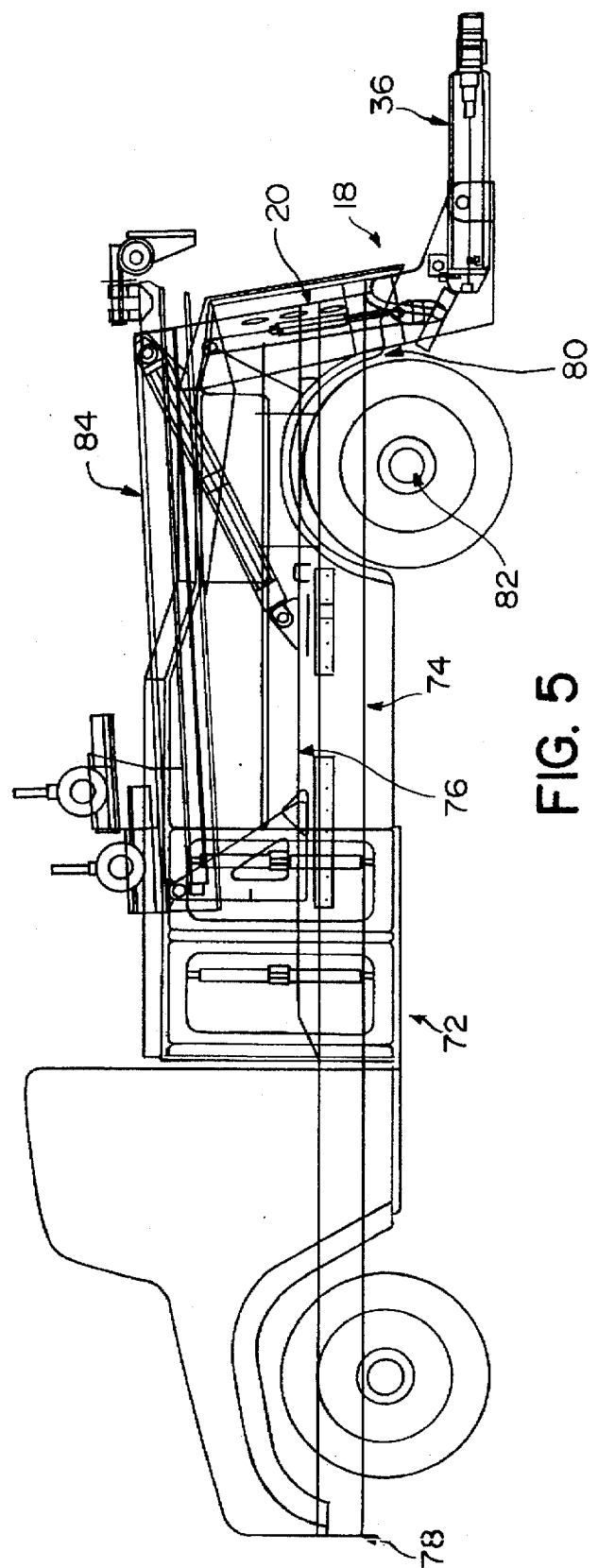
FIG. 5 is a side view of the present invention shown in an operating position mounted on a heavy duty truck.
Figure 6:
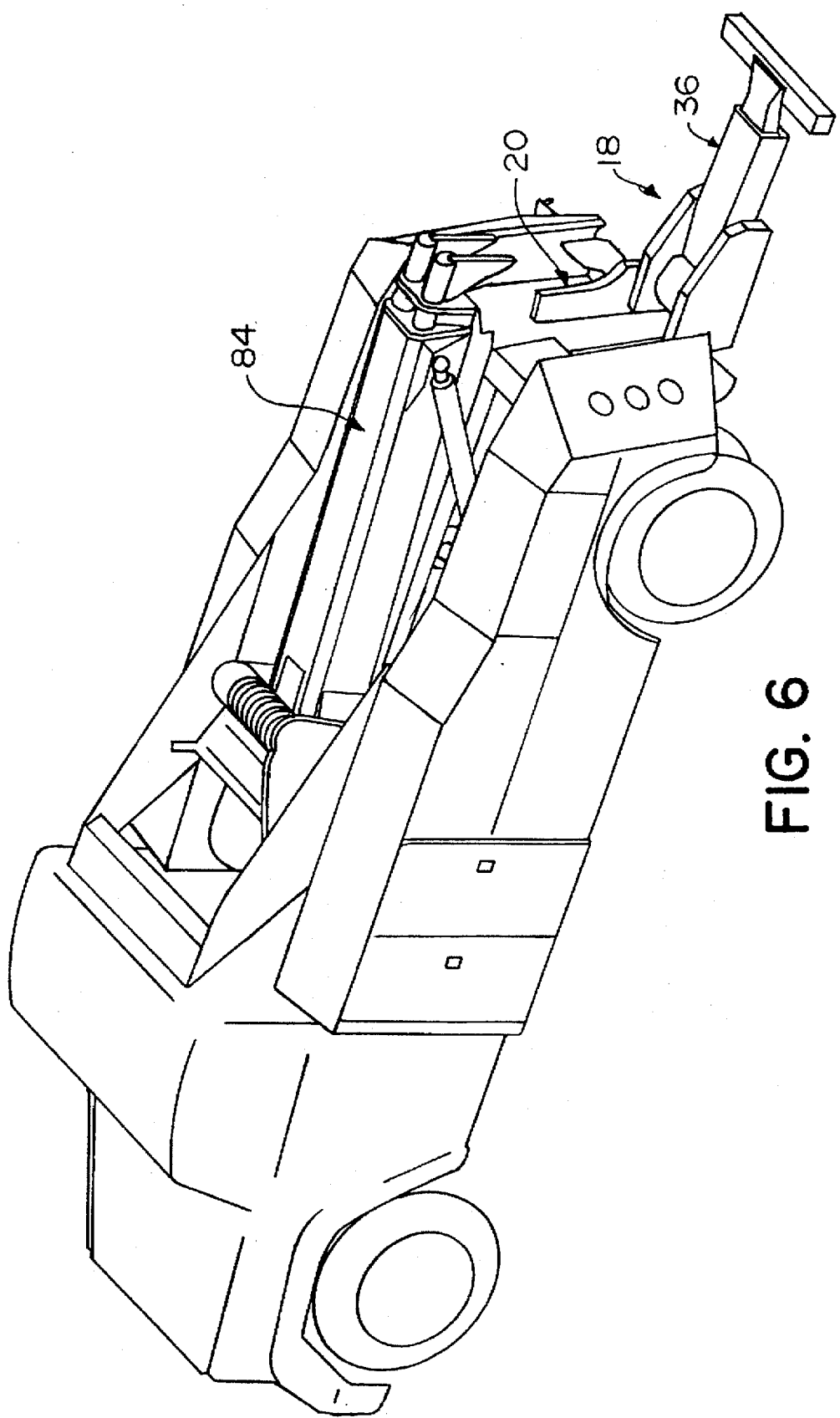
FIG. 6 is an isometric view of the present invention shown in an operating position mounted on a heavy duty truck.

Variations on the above embodiment are possible. For example, as illustrated in FIG. 5, the underlift assembly 18 of the present invention is shown in normal operating position coupled to a tow truck chassis 72. The tow truck chassis includes spaced frame members 74 and a deck 76 above said frame members. The tow truck chassis has a forward end 78 and a rearward end 80 including a rear axle 82. Coupled to the tow truck chassis 72 is a lifting boom 84 and the underlift assembly 18 as shown is coupled to the lifting boom 84.

In yet another variation and merely by way of example, other types of actuators, such as screw motor driven screw actuators may be utilized as the first, second, and third actuators of the invention.

The invention described above provides a number of significant advantages. The improved underlift assembly provides improved ground clearance due to the short range of extension of the first actuator. The first actuator is only responsible for the lifting operation so can be designed specifically for the operating load. The second actuator which is not directed towards the ground provides the additional extension needed to perform the folding function. The improved underlift therefore has the advantages of improved ground clearance and load capability along with the benefit of a boom that can be folded into a rest position for storage.

Of course it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of the this invention.

I claim:

1. An underlift assembly for attachment to a vehicle comprising:

a support arm coupled to the vehicle;

a base coupled at a first end to the support arm;

a boom base pivotally attached to the base at a first pivot point, the first pivot point located adjacent to a second end of the base opposite to the first end of the base, and adjacent to a first end of the boom base;

the boom base having a second end located nearer to the first end of the base than the first end of the boom base;

a boom pivotally attached to the boom base at a second pivot point located further from the first end of the boom base than the first pivot point;

a first actuator coupled to the support arm and the boom base, wherein the operation of the first actuator pivots the boom base with respect to the support arm;

a second actuator coupled to the boom base and the boom, wherein the operation of the second actuator pivots the boom with respect to the boom base attachments coupled to a distal end of the boom;

wherein the attachments coupled to the distal end of the boom provide connection to objects to be lifted.

2. The underlift assembly of claim 1 further comprising:

a first stop attached to the boom base, located between the second pivot point and the second end of the boom base; and a second stop attached to the boom base, located below the first pivot point;

wherein the first and second stops restrict the boom from pivoting below a line formed by a lower edge of the boom base.

3. The underlift assembly of claim 1 wherein:

the boom comprises a first boom stage, a second boom stage, and a third boom stage;

wherein the three boom stages are telescopically related.

4. The underlift assembly of claim 3 further comprising:

the first boom stage pivotally attached to the boom base at the second pivot point, and the second actuator coupled to the first boom stage.

5. The underlift assembly of claim 3 further comprising:
a third actuator coupled to the first boom stage and the third boom stage;
wherein the operation of the third actuator telescopes the three boom stages.

6. The underlift assembly of claim 5 wherein: the third actuator comprises a hydraulic actuator.

7. The underlift assembly of claim 1 wherein:
the first actuator and the second actuator each comprise hydraulic actuators.

8. The underlift assembly of claim 1 wherein:
the first actuator positions the boom during operation, and the second actuator positions the boom into a folded rest position.

9. The underlift assembly of claim 1 wherein:
the boom base pivots, with respect to the base, with a range of motion of approximately about plus or minus 15 degrees from horizontal.

10. The underlift assembly of claim 1 wherein:
the boom pivots, with respect to the boom base, from a position where a lower edge of the boom is substantially level with a lower edge of the boom base upward to a position where the boom is substantially parallel to the support arm.

11. A tow truck for lifting a part of a vehicle and towing the vehicle comprising:
a tow truck chassis including spaced frame members and a deck above said frame members, and said tow truck chassis having a forward end and a rearward end including a rear axle,
a support arm coupled to the tow truck;
a base coupled at a first end to the support arm;
a boom base pivotally attached to the base at a first pivot point; the first pivot point located adjacent to a second end of the base opposite to the first end of the base, and adjacent to a first end of the boom base;
the boom base having a second end located nearer to the first end of the base than the first end of the boom base;
a boom pivotally attached to the boom base at a second pivot point located further from the first end of the boom base than the first pivot point;
a first actuator coupled to the support arm and the boom base, wherein the operation of the first actuator pivots the boom base with respect to the support arm;
a second actuator coupled to the boom base and the boom, wherein the operation of the second actuator pivots the boom with respect to the boom base;
attachments coupled to the boom for engaging a vehicle for lifting a part thereof.

12. The underlift assembly of claim 11 further comprising:
the boom restrained by a first stop and a second stop from pivoting below a line formed by a lower edge of the boom base.

13. The underlift assembly of claim 11 wherein:
the boom comprises a first boom stage pivotally attached to the boom base and coupled to the second actuator, a second boom stage, and a third boom stage;
wherein the three boom stages are telescopically related.

14. The underlift assembly of claim 13 further comprising:
a third actuator coupled to the first boom stage and the third boom stage;
wherein the operation of the third actuator telescopes the three boom stages.

15. The underlift assembly of claim 14 wherein:
the third actuator comprises a hydraulic actuator.

16. The underlift assembly of claim 11 wherein:
the first actuator and the second actuator each comprise hydraulic actuators.

17. The underlift assembly of claim 11 wherein:
the boom base pivots, with respect to the base, with a range of motion of approximately about plus or minus 15 degrees from horizontal.

18. The underlift assembly of claim 11 wherein:
the boom pivots, with respect to the boom base, from a position where a lower edge of the boom is substantially level with a lower edge of the boom base upward to a position where the boom is substantially parallel to the support arm.

19. The underlift assembly of claim 11 further comprising:
a lifting boom coupled to the tow truck chassis; and
wherein the underlift assembly is coupled to the tow truck by coupling the underlift assembly to the lifting boom.

* * * * *